Dec. 6, 1949　　　　T. IAVELLI ET AL　　　　2,490,592
POWER TRANSMISSION
Filed May 31, 1945　　　　　　　　　　　　5 Sheets-Sheet 3
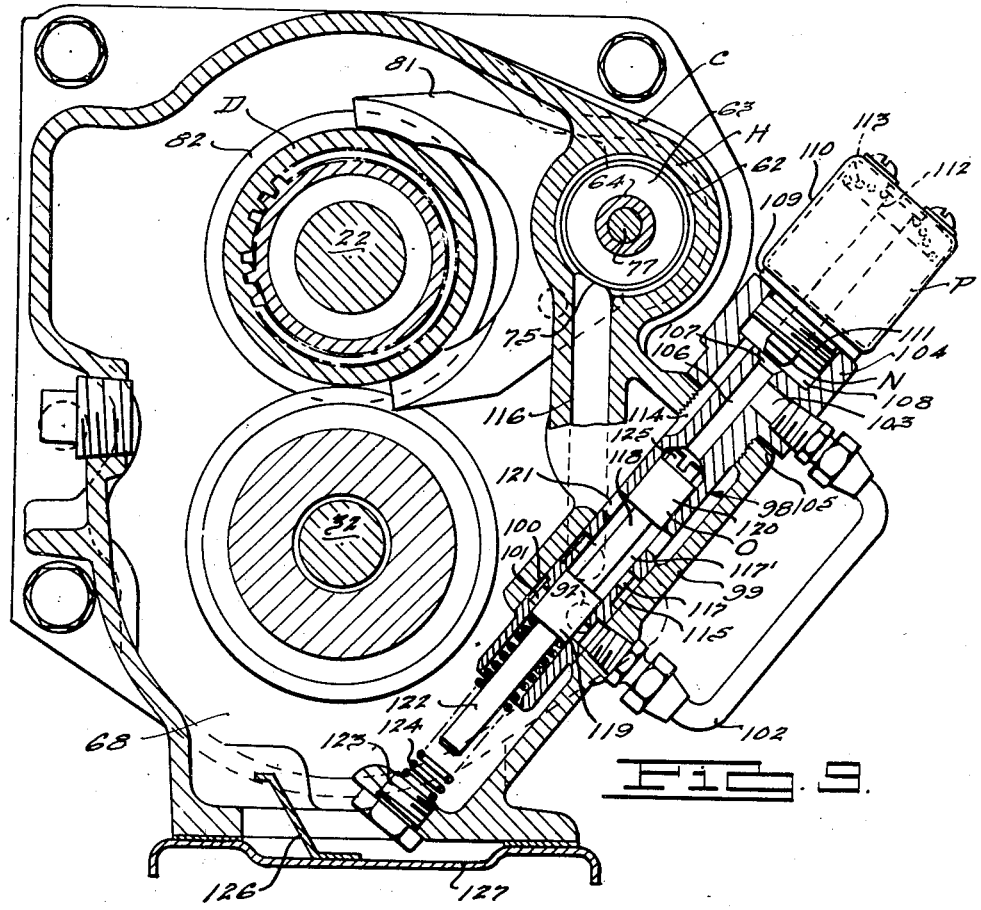
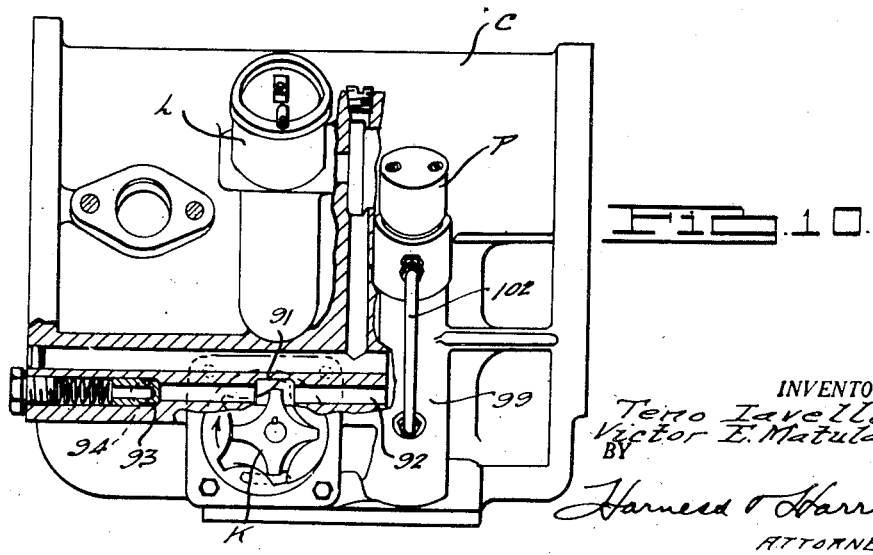
INVENTORS.
Terio Iavelli.
Victor E. Matulaitis
BY
Harness & Harris
ATTORNEYS.

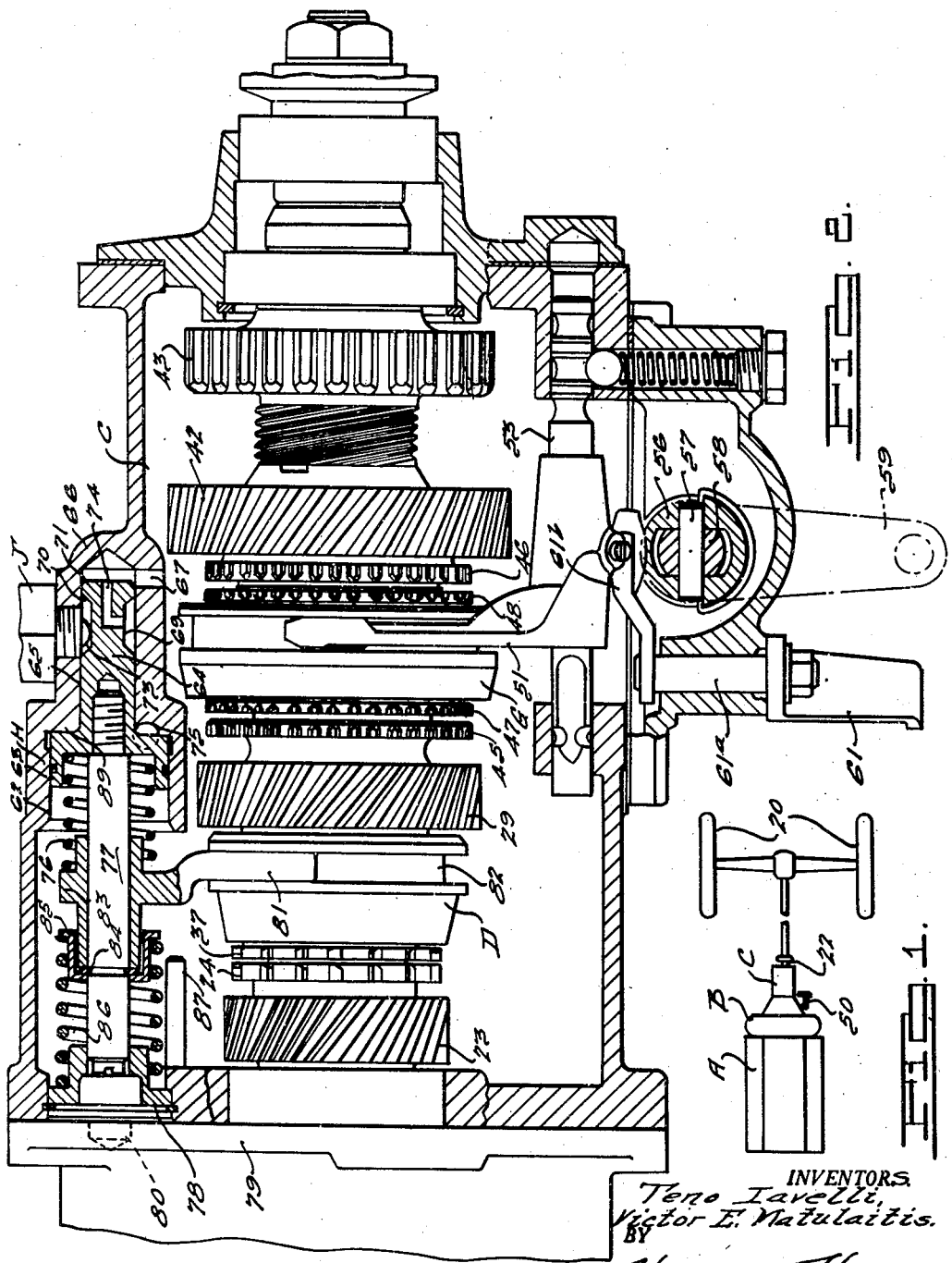

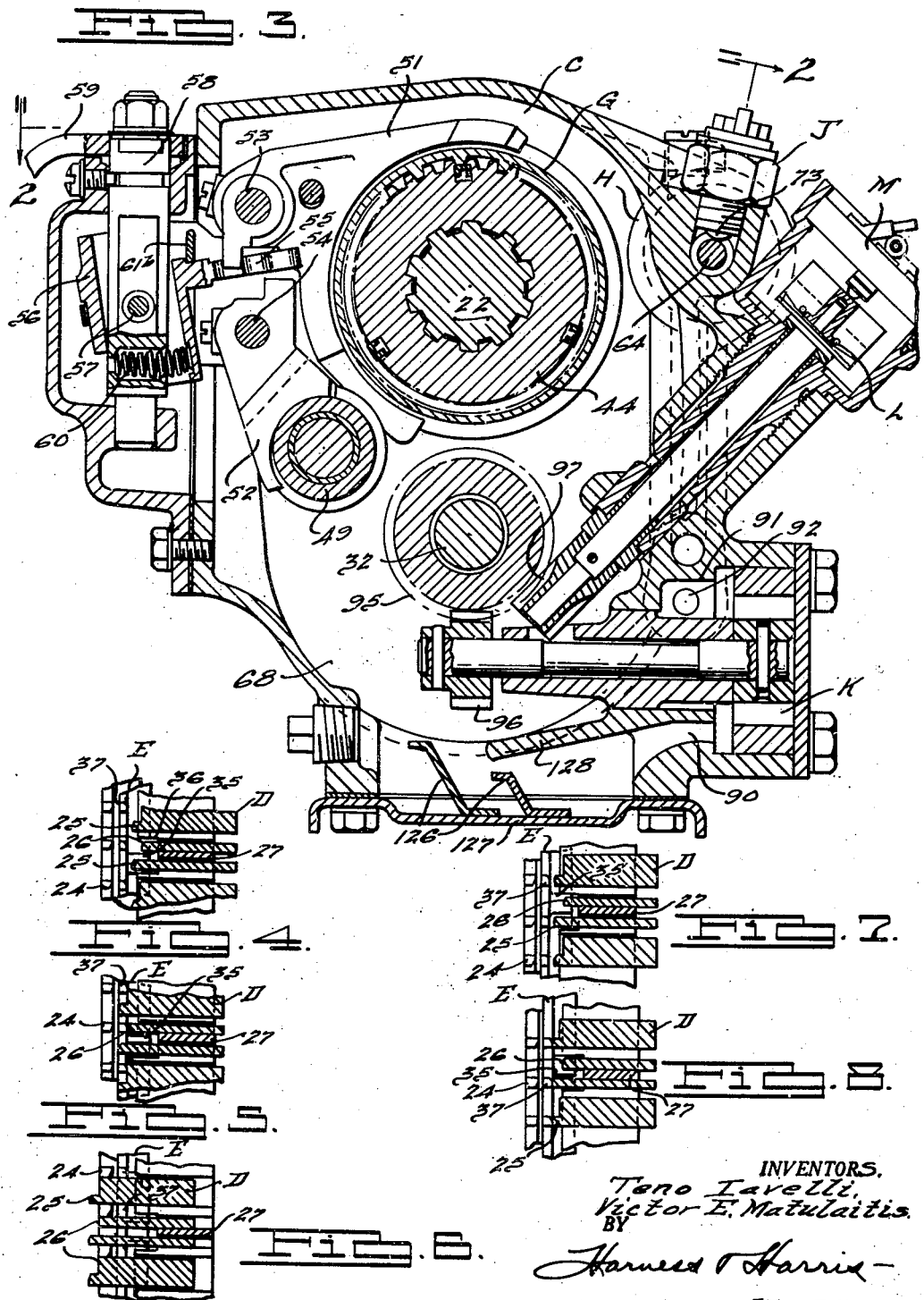

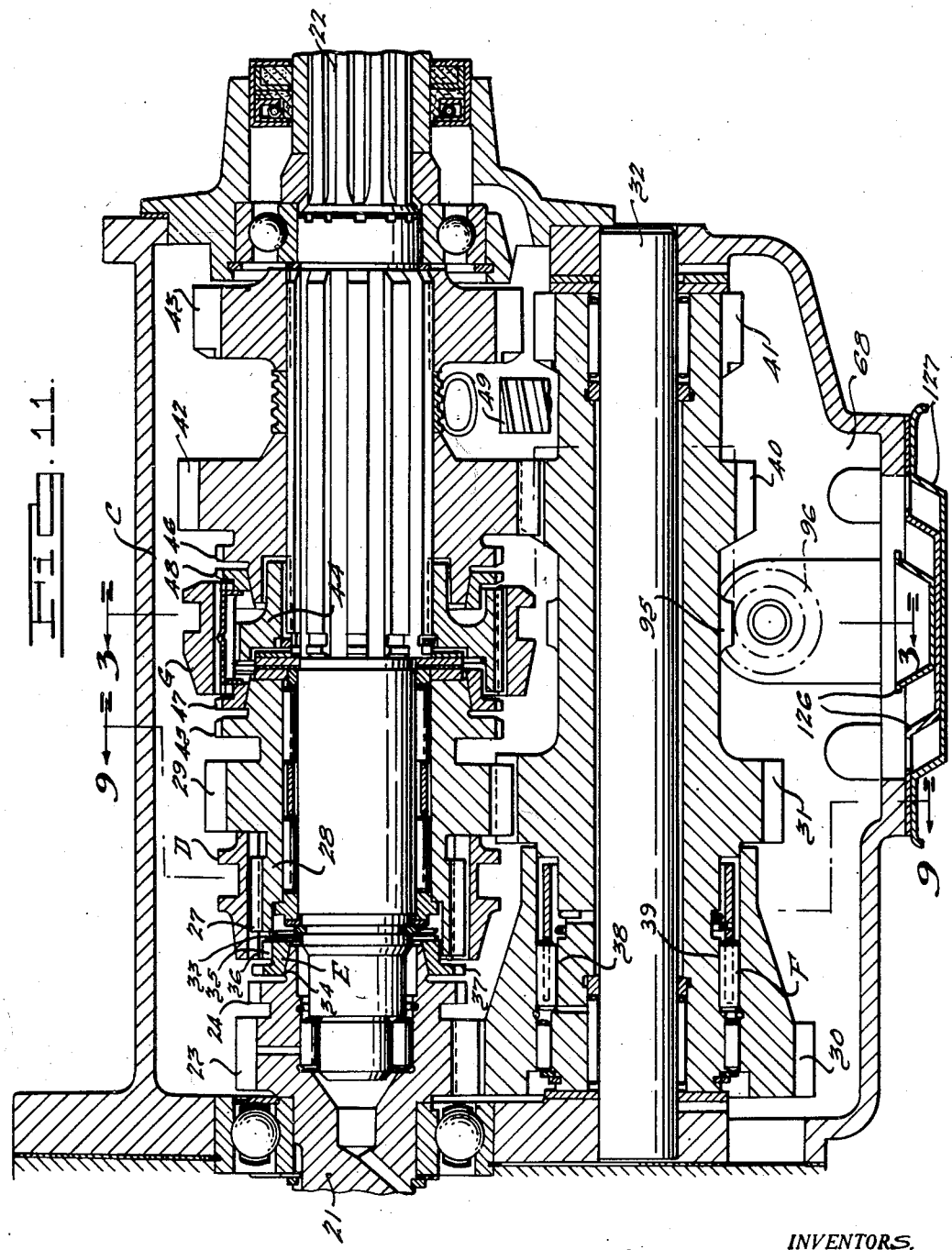

Dec. 6, 1949
T. IAVELLI ET AL
2,490,592
POWER TRANSMISSION
Filed May 31, 1945
5 Sheets-Sheet 5
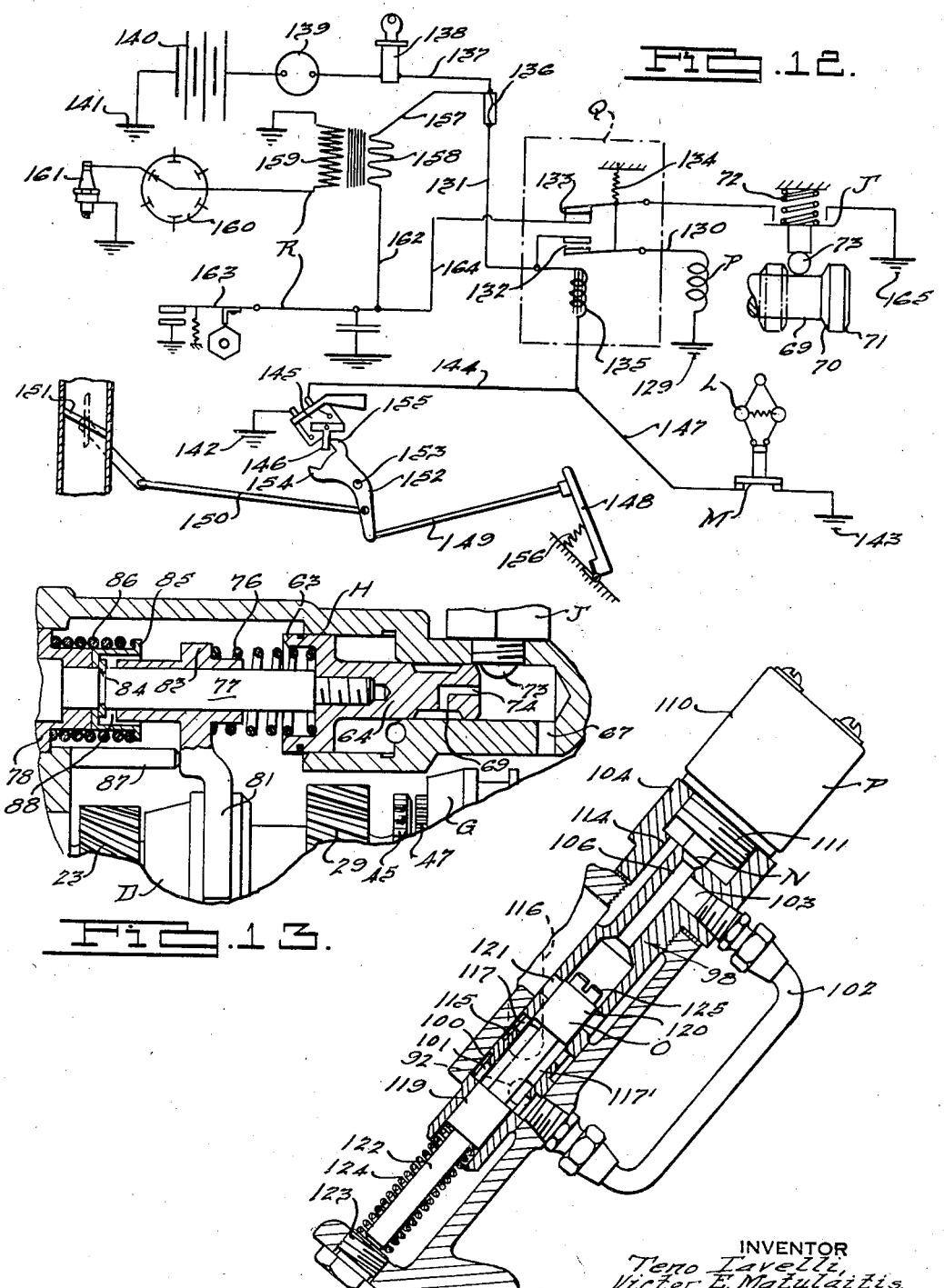
INVENTOR
Teno Iavelli,
Victor E. Matulaitis.
BY
Harness & Harris
ATTORNEYS.

Patented Dec. 6, 1949

2,490,592

UNITED STATES PATENT OFFICE 2,490,592

POWER TRANSMISSION

Teno Iavelli, Detroit, Mich., and Victor E. Matulaitis, Rochester, N. Y., assignors to Chrysler Corporation, Highland Park, Mich., a corporation of Delaware Application May 31, 1945, Serial No. 596,841

20 Claims. (Cl. 74—472)

1

This invention relates to power transmissions and refers more particularly to improvements in transmissions of the type adapted to transmit power from the engine to the driving wheels of motor vehicles.

In transmissions of the automatic or semi-automatic types, prior to our invention, servo-motor means of the pressure fluid type has been provided for power manipulative control of speed ratio change. Such servo-motors often employ oil or the equivalent as the operating medium and are known generally as "hydraulically" operated transmissions. In arrangements of this type it has been customary to provide a valve for the control of the oil to the servo-motor and usually the valve is itself operated by a motor such as a solenoid which lends itself to convenient control by governor, kickdown switch, dash switch, and other controls. In order to properly control the oil pressure supply to the servo-motor and venting the same, it has been deemed necessary as a practical matter to provide porting of generous capacity which in turn requires a relatively long valve stroke of around ½ inch, by way of example. In order to quickly operate the type of valve required over a relatively long stroke, the solenoid for actuating the valve must be relatively large as it must naturally have sufficient capacity to do the work required. This results in a requirement for relatively high current, complicated wiring control circuit, and relatively high cost.

One object of our invention is to overcome the aforesaid objections by providing a control wherein the power required to operate the valve is largely derived from the pressure of the fluid operating medium.

Another object is to provide a control in which a very small size solenoid of small current requirement and small stroke in the order of around ⅛ inch, for example, is so arranged as to control a fluid servo-motor without sacrificing the desired generous size valve porting and quick valve operation.

A further object is to provide a control in which the electrical system for controlling the solenoid is of a simplified arrangement being required to carry only a relatively small current.

In carrying out our invention we provide what may be termed a pilot valve of relatively low inertia and small stroke, this pilot valve serving to control fluid pressure operation of a main valve which may have the desired generous porting and as large a size and stroke as desired without penalizing the solenoid. Such arrangement lends itself to quantity manufacture as it is not sensitive to minor variations as is the case where attempts are made to control the porting with a short stroke valve operated directly from the solenoid. Furthermore, with our arrangement the solenoid is not called upon to overcome sticking of the main valve as is experienced in cold weather.

Another object of our invention is to provide a simplified and improved control system for a transmission of the step-up and step-down type wherein ratio changes are produced by power shifts under control of the driver and in response to the speed of travel of the motor vehicle.

A further object is to provide an improved transmission operating system for control of positive interengageable drive control elements such that tendency of the parts to bind or fail to operate is obviated.

Further objects and advantages of our invention will be more apparent from the following description of a typical embodiment, reference being had to the accompanying drawings in which:

Fig. 1 is a diagrammatic plan view of the driving power plant for the vehicle.

Fig. 2 is a sectional plan view through the transmission taken approximately as indicated by line 2—2 in Fig. 3.

Fig. 3 is a transverse sectional elevational view indicated by line 3—3 of Fig. 11.

Fig. 4 is a partial development plan view of the automatic clutch sleeve and associated blocker controlled clutching parts, the sleeve being shown in fully released position and the blocker leading the sleeve.

Fig. 5 is a similar view illustrating the sleeve in drive blocked position.

Fig. 6 is a similar view illustrating the clutch sleeve fully clutched with the driving gear.

Fig. 7 is a similar view illustrating the sleeve in fully released position with the blocker lagging the sleeve.

Fig. 8 is a similar view illustrating the blocker in coast blocking relationship relative to the sleeve.

Fig. 9 is a transverse sectional elevational view through the transmission indicated by line 9—9 of Fig. 11.

Fig. 10 is a side elevational view of the transmission with parts broken away to illustrate the pumping system.

Fig. 11 is a longitudinal sectional elevational view through the transmission.

Fig. 12 is a control diagram for the transmission.

Fig. 13 is a partial view of the servo-motor of Fig. 2 but with the parts positioned for clutching of the automatic sleeve.

Fig. 14 is a view of the valving parts of Fig. 9 but illustrating another position of these parts.

In the drawings, Fig. 1 illustrates a typical motor vehicle power plant having a conventional engine A transmitting power through a hydraulic coupling and clutch assembly B of conventional arrangement, the drive then passing through transmission C to the rear vehicle ground wheels 20.

The transmission C comprises an input or driving shaft 21 which receives drive from engine A by way of the clutch assembly B, and an output or driven shaft 22 which is adapted to transmit drive to the vehicle ground wheels 20. The driving shaft 21 carries the main driving gear or pinion 23 and a set of positive jaw-type clutch teeth 24 adapted to be interengaged with a set of jaw-type clutch teeth carried by an automatic clutch sleeve D. The teeth of sleeve D are alternately cut back to provide in effect relatively long teeth 25 and short teeth 26, alternate adjacent pairs being bridged together as shown in Fig. 6.

Sleeve D is slidably splined at its non-bridged teeth 25, 26 on the axially fixed teeth 27 of a hub 28 carried by the driven third speed gear 29 which is rotatably journalled on the driven shaft 22 and adapted to be clutched thereto. The forward shift of sleeve D for clutching with teeth 24 is controlled by a blocker E whereby such clutching is limited to synchronous relationship in the speeds of rotation of gears 23 and 29 and, in the particular transmission illustrated, limited to engine coast conditions. When sleeve D is clutched with teeth 24, then the gears 23 and 29 are in two-way direct drive relationship for a 1 to 1 speed ratio drive therebetween.

Gear 29 is also adapted to be driven from gear 23 at a speed ratio different from 1 to 1 and to this end we have shown a countershaft type one-way reduction driving means between these gears. This drive comprises the coaxially rotatable countershaft gears 30 and 31 respectively in constant mesh with gears 23 and 29 and having an overrunning clutch F operably interposed therein. A stationarily mounted shaft 32 provides a journal support for the countershaft gears. Assuming the usual clockwise rotation of shaft 21, as viewed when looking from front to rear of Fig. 11, then overrunning clutch F will automatically clutch gears 30 and 31 together when gear 30 is driven counterclockwise at a speed tending to exceed that of gear 31 and automatically release the drive between these gears to allow gear 30 to freely slow down below the speed of gear 31.

As thus far described it will be apparent that with the parts arranged as in Fig. 11, drive of shaft 21 will cause the output gear 29 to be driven at a reduction drive through gears 23, 30, overrunning clutch F, and gear 31. Should the sleeve D be biased forwardly during this reduction drive, blocker E will obstruct sleeve D in an intermediate position of its shift preventing ratcheting of its teeth with teeth 24. However, if the driver releases the engine throttle control in the form of the usual accelerator pedal then, as will presently be apparent, overrunning clutch F will allow gear 23 to freely coast down relative to the sustained speed of gear 29 and when the speed of gear 23 reaches that of gear 29 blocker E will move to an unblocking position and allow sleeve D to move further forwardly to clutch with teeth 24 under synchronous conditions to provide the direct drive, clutch F continuing its overrunning operation. Upon return of sleeve D to its disengaged Fig. 11 position followed by speeding up the engine, overrunning clutch F will automatically engage to restore the reduction drive.

Referring particularly to Figs. 4 to 8 and 11, blocker E is under constant bias by a spring 33 of very light compression to cause the blocker to frictionally engage the cone portion 34 of gear 23 whereby the blocker attempts to assume the speed of gear 23 within the limits allowed by a lost motion "clocking" connection with hub 28 provided by the engagement of blocker drive lug 35 in a recess 36 of hub 28. The blocker has blocking teeth 37 engageable with the teeth of sleeve D to perform the blocking function.

In Fig. 4 the sleeve D is in its initial released position of Fig. 11 and the engine is driving gear 29 through the reduction drive thus causing gear 23 to rotate faster than gear 29. Blocker E is frictionally moved to one end of recess 36, leading the sleeve D.

In Fig. 5 the sleeve is shown biased forwardly to its intermediate blocked position during the Fig. 4 condition of drive through the overrunning clutch F. In Fig. 5 the drive lug 35 is in the position of leading the gear 29 as in Fig. 4 because gear 23 is rotating faster than gear 29. Short teeth 26 now engage the blocker teeth 37 thus blocking sleeve D against further forward movement and long teeth 25 are extended between adjacent blocker teeth 37 but there is no ratcheting of the teeth of sleeve D with teeth 24. This is the condition known as drive block of the sleeve D preparatory to clutching sleeve D with teeth 24 and may be maintained as long as desired simply by maintaining the speed of gear 23 faster than that of gear 29.

If now the driver releases the accelerator pedal then the gear 23 will begin to drop in speed and clutch F will overrun allowing gears 29 and 31 to maintain their speeds. As the speed of gear 23 falls off to approach the speed of gear 29, blocker D will be finally moved by its friction connection at 34 at the time when gear 23 has dropped to substantially the speed of gear 29 causing the blocker teeth 37 to slide off the ends of the short teeth 26 whereupon the sustained forward bias on sleeve D causes pairs of the teeth 25, 26 to move forwardly between the spaces between adjacent blocker teeth 37 and finally to interengage with clutch teeth 24 as shown in Fig. 6. Thus clutching of sleeve D is effected under blocker control during engine coast from a condition of drive block, such clutching protecting the mechanism against clutching under engine torque and insuring smooth clutching.

Fig. 8 illustrates the condition of coast block from which clutching of sleeve D is prevented without first establishing the drive block condition. In Fig. 8 the sleeve D has been biased forwardly from the Fig. 7 position while the gear 23 is rotating at a speed less than that of gear 29. This condition may be experienced where, for example, with the accelerator pedal released for engine idling, the vehicle accelerates from rest down a hill until the vehicle speed or other controlling instrumentality effects forward bias of sleeve D. Blocker E lags gear 29, the drive lug 35 being positioned at the end of recess 36 opposite to that shown in Figs. 4 and 5. Now the long teeth 25 engage the blocker teeth 37 holding the sleeve D blocked. If now the engine is accelerated by depressing the accelerator, gear 23 speeds up and in approaching the speed of gear 29 causes blocker teeth 37 to be rotated clockwise with gear 23 so as to slide off the ends of long teeth 25. Owing to the difference in the lengths of teeth 25 and 26 and because of the rotation of gear 23 faster than gear 29, the sleeve D will not pass through the blocker teeth 37 as the ends of the short teeth 26 will engage the blocker teeth. Thus, in effect, the blocker teeth jump the gap between the long and short teeth and the parts become positioned in the Fig. 5 drive block relationship with the engine picking up the reduction drive through the overrunning clutch F. Then if the accelerator pedal is released for the coast, sleeve D will become clutched as illustrated in Fig. 6 as aforesaid.

Transmission C is arranged to provide four forward speeds, neutral, and reverse along with automatic coast step-up at sleeve D from first to second, third to fourth, and a reverse step-up. Accelerator pedal kickdown is also provided as a step-down from fourth to third, second to first, and in the reverse.

Countershaft gear 31 is a part of a cluster comprising the cam portion 38 for the rollers 39 of overruning clutch F, a gear 40 and a reverse gear 41. Meshed with gear 40 is a mainshaft first speed gear 42 loose on the shaft 22, the latter carrying splined thereto the reverse driven gear 43.

A manually shiftable clutch G is slidably splined on a hub 44 fixed to shaft 22 and selectively clutches by shifting clutch G forwardly or rearwardly with teeth 45 or 46 under control of conventional synchronizer blockers 47 and 48 thereby to selectively clutch shaft 22 either with gear 29 or gear 42.

When clutch G is shifted forwardly to clutch with teeth 45 of gear 29, then with sleeve D released as in Fig. 11, there is provided a normal vehicle starting ratio in third speed through parts 23, 30, F, 31, 29, 45, G, 44, and 22. If now sleeve D is clutched with teeth 24 as aforesaid, then fourth speed or direct is obtained through parts 23, 24, D, 28, 29, 45, G, 44, and 22. For the kickdown from fourth to third, sleeve D is released thereby restoring third by picking up on the overrunning clutch F.

When clutch G is shifted rearwardly to clutch with teeth 46 of gear 42, then with sleeve D released as in Fig. 11, there is provided a maximum torque multiplying drive in first or low through parts 23, 30, F, 40, 42, 46, G, 44, and 22. If now sleeve D is clutched with teeth 24 as aforesaid, then second speed is obtained through parts 23, 24, D, 28, 29, 31, 40, 42, 46, G, 44, and 22. For the kickdown from second to first, sleeve D is released thereby restoring first by picking up on the overruning clutch F.

For low reverse, an idler gear 49 is meshed with gears 41 and 43 thus effecting reverse drive through parts 23, 30, F, 41, 49, 43, and 22. On coast, step-up of the reverse may be obtained by clutching of sleeve D, the faster reverse drive then passing through parts 23, 24, D, 29, 31, 41, 49, 43, and 22. Likewise by release of sleeve D the original low reverse drive may be restored.

As will presently be more apparent, vehicle speed responsive control means is provided for operation of sleeve D so that first, third, and low reverse are free-wheeling in the ordinary sense only below very low car speeds because ordinarily after the car is accelerated in any of these speeds release of the accelerator pedal will effect clutching of sleeve D for a two-way drive in second, fourth, or fast reverse almost immediately and as soon as the engine speed drops to synchronize the speed of pinion 23 with that of gear 29. When the car is brought to rest from a transmission setting in second, fourth, or fast drive reverse, or when the accelerator pedal is fully depressed, the automatic step-down or kickdown is effected accompanied by momentary unloading of the torque between the teeth 24 and the teeth of sleeve D thereby providing first, third, or low reverse as the case may be. Because of the fluid coupling at B between the engine A and transmission C it is not necessary for the driver to effect disconnection, as by de-clutching, in the drive between the engine and transmission. Ordinarily such de-clutching is employed at pedal 50 (Fig. 1) only in setting the transmission for forward or reverse drive, and for shifting to neutral in parking the car.

Usually, forward driving is effected by manually shifting sleeve G forwardly for high range clutching with gear 29. The car is then accelerated in third with coast step-up to fourth, thence automatically back to third under governor control in stopping or in response to accelerator kickdown when torque multiplication is desired through the transmission. Starts and stops are thus made without de-clutching at pedal 50 as the fluid coupling allows the engine to idle with the car at rest.

If desired, the car may be started in first by shifting sleeve G to clutch with gear 42, thence automatically to second for a coast step-up under governor control. On stopping or in response to accelerator kickdown, first is automatically restored. When in second, a shift of sleeve G forwardly to clutch with gear 29 will provide fourth, skipping third. Also, starting in first followed by forward shift of sleeve G will provide third, skipping second, and fourth is then obtained by the coast step-up.

When sleeve G is maintained in its Fig. 11 neutral position, low reverse is obtained by rearward shift of idler 49. Step-up of reverse may be effected by coast under governor control followed by restoration of low reverse by stopping the car or by accelerator kickdown.

In order to effect manual shifts of sleeve G and idler 49 we have provided a pair of shift collars, one at 51 for sleeve G and the other at 52 for idler 49 (Figs. 2 and 3). Collars 51 and 52 are respectively fixed to shift rails 53 and 54 and the collars are forked for selective engagement by the lever portion 55 of an operator 56 pivotally mounted at 57 to an upright oscillatory shaft 58 adapted to be rocked by a lever 59. Lever 55 is biased by a spring 60 for normally engaging yoke 51 but may be rocked on pivot 57 to engage yoke 52 for the reverse drive by a lever 61 operating through a rock-shaft 61ª and lever 61ᵇ. Any suitable known means, such as the steering column mounted shift lever illustrated in the patent to O. E. Fishburn No. 2,284,191 of May 26, 1942, may be provided to effect selective operation of lever 55 and shift of lever 59 in order to selectively shift sleeve G fore and aft and to shift idler 49, such control not forming a part of our present invention.

In order to control the shift of sleeve D we have provided a spring and pressure fluid operated servo-motor H comprising a cylinder 62 receiving the fluid operated element or piston 63 having the rearward reduced rod portion 64 slidably fitting the reduced cylinder extension 65 which terminates rearwardly in a closure wall 66 having associated therewith a drain passage 67 located rearwardly beyond the end of rod 64 for draining off to the transmission oil reservoir or sump 68 any oil which may leak from cylinder 62 rearwardly beyond rod 64.

The rod 64 is necked at 69 bounded rearwardly by cammed portions 70, 71 for controlling an engine ignition interrupter switch J of known type. This switch (Fig. 12) is biased to open position by a spring 72 and has its operating stem engaging a ball 73 so arranged in association with the neck 64 that switch J is open when piston 63 is in the Fig. 2 position at which time cylinder 62 is vented and sleeve D is in the Fig. 11 released position. Drainage of oil to passage 67 is facilitated by a passage 74 between the portions of the cylinder extension 65 at neck 69 and rearwardly of the rod 64. Oil under pressure is admitted to cylinder 62 behind piston 63 by the opening 75.

Piston 63 is skirted to present a forwardly opening chamber for receiving one end of the relatively light sleeve engaging spring 76 seated on the piston head and surrounding a piston rod 77 fixed at one end to the piston and having its other end slidably supported in the bore of a guide support 78 fixed in the transmission case adjacent the front closure wall 79 which has a drilled recess 80 to accommodate the forward end of rod 77 when the piston is projected forwardly (Fig. 13).

A shift yoke 81 engages the shift groove 82 of sleeve D and has a mounting head portion 83 bored to slidably receive the rod 77 and against which the forward end of spring 76 bears to impart forward bias on sleeve D in response to forward movement of piston 63. Forward movement of head 83 is limited in Fig. 2 by a snap ring 84 fitted in a groove in rod 77, and against the forward face of this snap ring there is seated a spring seating cup 85 for seating the rear end of a relatively strong or heavy kickdown spring 86, the forward end of which has a fixed seat on the support 78.

When oil under pressure is admitted at passage 75 to cylinder 62, piston 63 completes its forward power stroke to its Fig. 13 position carrying with it the rod 77 and cup 85 serving to compress and further load the kickdown spring 86. At the same time, the engaging spring 76 is further compressed biasing the yoke 81 and hence sleeve D forwardly. However, sleeve D will be intercepted by blocker E as in Fig. 5 or Fig. 8 and will not move to clutch with teeth 24 for one of the aforesaid step-up transmission changes until the engine is allowed to coast from the Fig. 5 drive block condition as aforesaid. Although, during the pressure fluid power stroke of the piston, the cams 70 and 71 cause a momentary closing of the interrupter switch J, the engine ingition is not interrupted because at such time the ignition grounding line is elsewhere broken as will be presently apparent. When piston 63 is in its forward position of Fig. 13, switch J is open because cam 71 has moved forwardly free of the ball 73 as indicated by the broken line showing in Fig. 12.

The forward stroke of the piston 63 is limited by engagement of the cup 85 with the support 78. The forward stroke of the collar 81 and sleeve D is less than that of piston 63 and is determined by engagement of the yoke head 83 with a fixed stop pin 87. The difference in the strokes of the piston and sleeve is such as to open a lost-motion gap 88 (Fig. 13) between the forward end of the head 83 and the abutment ring 84, this gap being sufficient to permit cam 71 to close switch J when the oil pressure is relieved at the cylinder 62 while sleeve D remains in its clutched position. In this manner the ignition is interrupted for the down-shift movement of sleeve D while torque is being transmitted between the teeth 24 and the teeth of the sleeve, the ignition interruption serving to unload the torque sufficient to allow the spring 86 to restore the sleeve D to its Fig. 2 position. Thus when the oil pressure is vented at cylinder 62, by the kickdown movement of the accelerator pedal or by action of the governor in stopping the car, spring 86 operates to move rod 77 and piston 63 to take up the lost-motion gap 88, cam 71 closing the switch J to effect ignition interruption and torque unloading at sleeve D. Then rod 77 and yoke 81 move rearwardly as a unit by action of the heavy spring 86, cam 70 serving to restore the ignition by allowing switch J to open just as the sleeve teeth are leaving teeth 24, the rod and yoke continuing the rearward movement back to the Fig. 2 position until piston 63 abuts the cylinder head portion 89 adjacent the extension 65.

The medium employed to operate the motor H is preferably oil under pressure and the oil in the transmission is preferably employed. This oil is stored in the reservoir 68, a pump K drawing oil by an inlet passage 90 and delivering oil under pressure to the outlet chamber 91 of the gallery 92 closed at one end (Fig. 10) by a spring loaded relief valve 93 arranged to quickly build up the desired pressure in the pressure system served by the pump K and to maintain this pressure, excess oil pressure being relieved by unseating valve 93 until relief or vent passage 94 is exposed to the gallery 92 to an extent determined by the speed of pump K and demand of the system for oil under pressure.

Pump K is preferably driven at a speed proportionate to the speed of travel of the car, as is also a governor L. Both of these devices are accordingly driven from a common helical gear 95 (Figs. 3 and 11) carried by the countershaft cluster and meshed with the driven gear elements 96 and 97 for respectively driving pump K and governor L. Inasmuch as for all vehicle drives, the countershaft cluster is drivingly connected with the driven shaft 22, it will be apparent that the pump and governor are driven at speeds proportionate to the car speed.

Governor L is provided with a switch M so arranged that it is biased closed until the vehicle is driven up to some predetermined speed, such as around 18 to 20 miles per hour in third for example, at which speed the switch will open. The governor will also open at some lesser speed in accelerating the car from rest in first, depending on the difference in the selected gear rations of first and third, because in first the countershaft will rotate faster than in third for a given car speed. As will be apparent presently, opening of the governor switch M effects fluid energization of motor H for upshift at sleeve D although the upshift may be delayed under driver control as it is not effected until the driver releases the accelerator pedal to bring about the engine coast. For the downshift operation of sleeve D, governor switch M will close to bring this about when the car slows down to some desired speed usually less than that at which switch M opens due to inherent friction and inertia factors often designed into the governor for desirable overlap in the speeds of functioning to operate switch M. Thus, for example, switch M may close at around 10 to 12 miles per hour of car speed when in fourth and, of course, at a lesser car speed when the car is brought to rest in second. Sleeve DD is also controlled for the downshift independently of closing of governor switch M, as by the kickdown operation of the accelerator pedal as will be presently described.

Returning now to the oil pumping system, oil under pressure from gallery 92 is delivered to a valving system under control of a pilot valve N as follows. A main valve O is slidably mounted in a ported sleeve 98 fixed within the transmission case side wall portion 99. This sleeve is formed with an annular passage 100 ported inwardly through the sleeve at 101, passage 100 opening to the header 92 and outwardly through the case to one end of an oil pipe 102, the other end of which is open to the radial passage 103 formed in the enlarged outer sleeve head 104 which seats externally on the case portion 105.

Passage 103 opens inwardly to the axial passage 106 in sleeve 98, this passage opening upwardly at a terminal valve seat 107 to the chamber 108 formed in the head 104, this chamber being closed by a plate 109 carried by the housing structure 110 of a solenoid P secured to head 104 at the threaded stem portion 111. The solenoid armature 112 is biased outwardly or upwardly by a spring 113 and extends inwardly through solenoid P and plate 109 to carry the valve N which, when solenoid P is energized, serves to engage seat 107 and close the communication between passage 106 and chamber 108. Chamber 108 is open for oil flow back to the sump 68 by one or more sleeve passages 114.

Sleeve 98 is further formed with an annular passage 115 open outwardly to the inner end of a passage 116 for delivery of oil under pressure to the cylinder 62 at passage outlet 75, the annular passage 115 being ported inwardly at 117 to register, in the Fig. 9 position of parts, with the space 117' within sleeve 98 formed by the reduced neck portion 118 which connects the enlarged valve heads 119, 120 slidably fitted to the inside diameter of the sleeve.

Sleeve 98 is additionally formed with ports 121 extending therethrough for opening space 117' to the sump 68. Inwardly of the valve head 119 the valve has a reduced stem 122 which limits inward movement of valve O, as seen in Fig. 14, by engagement with an abutment plug 123 secured to the case. A spring 124 surrounds stem 122 and acts between plug 123 and head 119 to bias valve O outwardly until, as in Fig. 9, the pronged outer end 125 of the valve abuts the juncture of passage 106 with the adjacent enlarged bore of the sleeve in which head 120 is fitted, this bore being always open to passage 106 above head 120.

In Fig. 9 the solenoid P is deenergized and oil from pump K will be delivered at 92 to the pipe 102, head 119 closing ports 101. The oil flows from pipe 102 to passage 106 and, as valve N is unseated, the oil freely flows to chamber 108 and by passage 114 back to the reservoir 68 without tendency to act on head 120 under pressure. Hence valve O remains in the Fig. 9 position under the biasing action of spring 124. Furthermore cylinder 62 is vented by reason of passage 116 being open to the reservoir through the various passages and ports 115, 117, 117', and 121.

When solenoid P is energized then the pilot valve N seats at 107 closing passage 106 against venting at 114. This causes an immediate build up of oil pressure in passage 106 which acts on head 120 of the main valve O such that the oil pressure operates to move valve O inwardly to its Fig. 14 position. As the valve moves inwardly the head 120 closes the vent ports 121 just prior to the action of head 119 in uncovering ports 101 for opening the oil pressure supply from gallery 92 to the passage 117', ports 117, and motor supply passage 116, thereby insuring speedy continued movement of valve O from its Fig. 9 position to its Fig. 14 position, once solenoid valve N has been seated at 107.

It will be apparent that with our arrangement it is possible to employ a solenoid P of very small size as the work required to be performed by the solenoid is of a very small order. Furthermore, the solenoid P is required to move its armature 112 for only a very short stroke in operating the pilot valve N from the Fig. 9 position inwardly to a position shown in Fig. 14 where the pilot valve closes the outer end of the passage 106. While oil pressures developed by the pump K may readily be varied for different types of transmissions and under varying conditions of use by reason of the setting of the relief valve 93, selecting pumps of varying capacity and arranging varying driving speeds therefor, we contemplate developing a normal pump pressure in the gallery 92 of around 50 to 70 lbs. per square inch for the particular transmission control system which we have illustrated. With such arrangement and where the diameter of the passage 106 is in the order of $\frac{3}{16}$ of an inch, it will be apparent that the solenoid P is required to have an effective force of approximately 2 to 3 lbs. for seating the pilot valve N and maintaining the same seated as in Fig. 14 against the pressure of the oil from gallery 92 to the passage 106. Furthermore, this very small size capacity solenoid P requires a correspondingly relatively small amount of current for its energization and this in turn enables the use of a relatively simple and inexpensive arrangement of wiring and control system.

Our arrangement also has the advantage of utilizing the oil pressure in the passage 106 after the pilot valve N has been seated at 107, for moving the valve O from the Fig. 9 position to the Fig. 14 position, and with such an arrangement the valve stroke may be made as long as desired and generous porting may be provided so as to insure proper working of the system within liberal tolerances in the manufacture of the parts. This in turn simplifies the control system and renders the same fool-proof in the assembly and use of the operating mechanism. It will be apparent that with the valving parts positioned as illustrated in Fig. 14, at which time the pressure fluid is being supplied to the motor H for effecting clutching of the sleeve D as illustrated in Fig. 13 and for maintaining the same clutched, deenergization of the solenoid P will cause the pilot valve N to be restored to the Fig. 9 position by reason of the spring 113. This immediately opens the passage 106 to the vent 114 whereupon the spring 124 operates to move the main valve O outwardly from the Fig. 14 position back to the Fig. 9 position serving to cut off the supply of pressure fluid from the gallery 92 to the passage 116 and opening this passage to the vent or relief ports 121 whereupon the motor H is vented and the kickdown spring 86 comes into action for effecting disengagement of sleeve D back to the Fig. 11 position, preferably accompanied by some form of torque unloading at the teeth of sleeve D hereinafter illustrated as a means for momentarily interrupting the ignition system of the engine A. At this time the oil which is pumped by the pump K flows through the pipe 102 and into passage 106 and spills over through the valve seat 107 and through the vent 114.

We have provided a means for effectively collecting or trapping any sediment in the reservoir or sump 68 so that this sediment will not be introduced to the intake passage 90 of pump K, this means at the same time serving to prevent surge of the oil in the reservoir due to sudden acceleration or retardation of the vehicle and thus insuring a supply of clean oil to the pump K in adequate quantity. This means comprises the upstanding inclined baffles 126 carrried by the bottom closure pan 127 of the transmission case, the latter having the inwardly extending wall 128 (Fig. 3) extending from the upper boundary of the intake passage 90 and overlying the shorter baffle 126 so as to cooperate with these baffles to accomplish the aforesaid functions.

Referring now to Fig. 12, we have diagrammatically illustrated an electrical system for control of our transmission mechanism wherein the solenoid P is grounded at one end at 129 and has its other end extending by a conductor 130 to a wire 131 under control however, of a set of switch points 132 of a relay Q, the latter having a second set of switch points 133. The sets of switch points each have a movable contact element connected to one another so that when one of the sets of points is closed the other is open and vice versa, a spring 134 biasing the relay points so that the points 132 will close and the points 133 simultaneously open upon deenergization of the relay Q. This relay further includes the energizing solenoid 135 for controlling the relay points in conjunction with spring 134 and in Fig. 12 it will be apparent that the solenoid 135 is energized thereby serving to open the points 132 and close the points 133 against the biasing action of the spring 134.

The wire 131 extends through a fuse 136 to the wire 137 and thence through the ignition switch 138, ammeter 139, to the usual storage battery 140 having a ground at 141. The wire 131 from the battery extends to one end of the solenoid 135 and also by shunt connection through the points 132, wire 130, solenoid P, and thence to the ground 129, as aforesaid. The other end of the solenoid 135 is adapted to be grounded at either of two shunt paths leading to the grounds 142 and 143. One of these paths extends by wire 144 through an accelerator pedal controlled kickdown switch 145 illustrated as a snap type of switch controlled by the snap-over operator 146. The other shunt path extends by a wire 147 through the aforesaid governor controlled switch M operated by the governor L which is driven as aforesaid at a speed proportionate to the travel of the motor vehicle by reason of the drive 95, 97 shown in Fig. 3.

The usual accelerator pedal 148 is diagrammatically illustrated as operating through the linkage 149, 150 connected to the conventional engine throttle valve 151, the linkage also including a lever 152 pivotally supported at 153 and being provided with the spaced fingers 154 and 155 operably associated with the switch operator 146. In Fig. 12 the accelerator pedal is illustrated in its fully released position under the biasing action of spring 156 causing the throttle valve 151 to close and bringing the finger 155 in position to move the switch operator 146 to a position for opening the kickdown switch 145, thereby breaking the shunt path through wire 144 to the ground 142. The arrangement is such that when the operator depresses the accelerator pedal 148 the throttle valve 151 is proportionately opened and as the accelerator pedal nears its wide open throttle position then the finger 154 will be brought to register with the switch operator 146 so that during the final throttle opening movement of the accelerator pedal, usually the last seven degrees of throttle opening movement, the switch 145 will be operated so as to snap over to its closed position thereby grounding the wire 144 at 142. Furthermore, once the kickdown switch has been closed in this manner then it will remain in the closed position until the accelerator pedal has been fully released, it being apparent that during the last few degrees of final releasing movement of the accelerator pedal the finger 155 will be operated so as to effect the snap-over action of switch 145 to restore the same to the open position illustrated in Fig. 12.

Extending from the battery supplied current delivery wire 137 is a wire 157 leading to a conventional system of ignition R for the engine A, this comprising the usual primary coil 158 and secondary coil 159, the latter leading to the usual distributor 160 and the various grounded spark plugs, one of which is illustrated at 161. The primary coil 158 extends by a wire 162 to the usual breaker mechanism 163, means being provided to momentarily ground the ignition system through a grounding wire 164 connected to the primary coil and leading through the relay points 133 and the interrupter switch J for grounding at 165.

The system as illustrated in Fig. 12 illustrates the condition of the parts when the car is at a standstill with the engine operating under idling condition at which time the accelerator pedal 148 is released, the kickdown switch 145 is open, the governor switch M is closed, and the motor H is vented so that the sleeve D is in its rearward released position illustrated in Fig. 11, at which time the interrupter switch J is open. When the governor switch M closed, current from the battery 140 flows through the wire 131, solenoid 135, governor switch M to the ground 143. With the relay solenoid 135 energized relay points 132 are open and points 133 are closed. Therefore, solenoid P is deenergized such that the pilot valve N will be in its Fig. 9 position opening the passage 106 to the vent 114. Although the relay points 133 are closed, it will be apparent that the ignition system R is not grounded at 165 because the interrupter switch J is open.

In driving the car forwardly the driver will depress the clutch pedal 50 and manually manipulate the transmission C for either first or third speeds or else reverse. Ordinarily vehicle starts are made by shifting sleeve G forwardly to the high range for clutching with the teeth 45 and with the sleeve shifted in this manner and the clutch pedal 50 released, the car may be accelerated by depressing the accelerator pedal 148.

As the car is accelerated in third the critical speed of the governor L will be reached causing the governor switch M to open and effecting energization of the motor H so as to bias the clutch sleeve D forwardly. However, the clutch sleeve will have its forward motion arrested by the blocker E in the drive block position of Fig. 5 and the car may be accelerated in the third speed to any desired speed and this speed may be maintained by the driver as long as desired, the upshift from third to fourth speed being delayed until the driver releases the accelerator pedal 148 for the synchronous coast step-up of the sleeve D.

During the drive in third and when the governor L operates to open the governor switch M it will be apparent that this will deenergize the relay solenoid 135 whereupon relay spring 134 will operate to close the relay points 132 and open the points 133. Upon closing of the points 132 solenoid P will be energized thereby effecting operation of the pilot valve N to the Fig. 14 position causing the oil delivered under pressure from pump K to move the main valve O from the Fig. 9 position to the Fig. 14 position and thus effect delivery of the oil pressure to the motor H for moving the piston 63 forwardly until the spring seat 85 engages the stop 78. The sleeve D although biased forwardly by the engaging spring 76 will be brought to rest in the Fig. 5 drive block position where it will be held from ratcheting with the clutch teeth 24 until the driver releases the pedal 148 for the coast step-up engagement of the sleeve D to effect drive in fourth. Although during the forward movement of piston 63 the cam 70 will operate to momentarily close the interrupter switch J, the ignition system R will not be grounded at 165 because during this forward stroke of the piston the relay points 133 are open and thus the grounding line 164 is broken.

The downshift from fourth to third may be effected by either of several controls. One of these controls responds to a full depression of the accelerator pedal 148 in bringing the throttle valve 151 to its fully opened position, thus effecting a closing operation of the kickdown switch 145. It is customary in devices of this sort to provide a yielding stop just prior to the last few degrees of throttle opening movement so that the driver does not accidentally effect the kickdown operation that is required to overcome the force of the yielding stop, which is additional to the return spring 156, although the provision of the yielding stop is not necessary. When the kickdown switch 145 is closed it will be apparent that relay solenoid 135 will be energized thus opening the points 132 and closing the points 133 and thus effecting deenergization of solenoid P, whereupon the solenoid spring 113 (Fig. 9) will restore the pilot valve N to the Fig. 9 position of venting the passageway 106 and causing the valve spring 124 to restore the main valve O to the Fig. 9 position of venting the motor H. It will be apparent that when this kickdown operation is effected the throttle 151 is substantially fully open so that the engine is delivering its torque through the teeth 24 and sleeve D, thus requiring some form of torque relief in order to facilitate rearward disengaging movement of sleeve D under the biasing action of the kickdown spring 86 and in the present illustration momentary interruption of the ignition system is employed for this purpose. In Fig. 12 the cams 70 and 71 are illustrated by broken lines to show the position of these cams when the piston 63 is in its fully forward position and at this time the sleeve D is engaged, there being a lost-motion gap 88 between the snap ring 84 and the head 83 of the shift yoke 81 as illustrated in Fig. 13. When the motor H is vented the sleeve D and head 83 will remain in the Fig. 13 position because of the torque at the clutch teeth 24, but the kickdown spring 86 will immediately operate the piston rod 77 and piston 63 rearwardly sufficiently to take up the gap 88, this motion being sufficient to cause the cam 71 to close the interrupter switch J thus grounding the ignition system R at 165 through the previously closed relay points 133. With the ignition thus interrupted the torque is relieved at teeth 24 and the kickdown spring 86 then acts to move the sleeve D and piston 63 rearwardly as a unit back to the Fig. 2 position of these parts, the cam 70 operating meanwhile to allow the interrupter switch J to open as the sleeve D leave the teeth 24 thus quickly restoring the ignition system R to its normal operation. The accelerator pedal being depressed will cause the drive shaft 21 to speed up and effect operation of the third speed by automatic clutching of the overrunning clutch F and the car may then be driven in third speed until the upshift is again desired and is obtained at any time, assuming that the speed of the car does not slow down sufficiently to cause the governor switch M to close, by releasing the accelerator pedal 148 to open the kickdown switch 145 and effect energizing of solenoid P with resulting supply of pressure fluid to the motor H for the coast step-up engagement of sleeve D with the teeth 24.

The other of the aforementioned controls for effecting the downshift from fourth to third comprises the governor control system for automatically directing a downshift when the car reaches a predetermined relatively low speed, as for example in bringing the car to rest. This control system operates to close the governor switch M resulting in providing a ground for the relay solenoid 135 so as to effect the downshift in the same manner as aforesaid by closing operation of the kickdown switch 145, it being apparent that this downshift will be effected accompanied by momentary interruption of the ignition system just as in the case of the accelerator kickdown. Thus on bringing the car to rest, as when stopping for a traffic light, it is not necessary for the driver to manually manipulate any of the transmission controls or the clutch pedal 50, the fluid coupling at B accommodating idling of the engine with the car at rest. When it is desired to again accelerate the vehicle, then the aforesaid cycle of operations for the upshift from third to fourth is repeated.

It will be apparent that the mechanism operates for step-up and step-down between first and second speeds in the same manner as aforesaid in connection with shifts between third and fourth. It is, of course, necessary for the driver to manipulate the transmission into the low range by effecting rearward shift of sleeve G to clutch with the teeth 46 in order to initially accelerate the car in first, the step-up to second being obtained when the car is driven above the critical speed of governor L and the accelerator pedal 148 is subsequently released for the synchronous coast step-up from first to second. When driving in second the first speed may be restored by either a full depression of the accelerator pedal 148 for the kickdown operation or by bringing the car to rest or slowing the same down sufficiently to effect closing of the governor switch M just as aforesaid.

It is possible for the car to be initially accelerated in first followed by a coast step-up to second and then when the sleeve G is shifted forwardly fourth will be obtained, skipping third. On the other hand if the car is accelerated in first and the sleeve G is shifted forwardly prior to the coast step-up, then third will be obtained by skipping second, and when the accelerator pedal is released for the coast step-up above the critical governor speed the fourth or direct speed will be brought into action.

The same general system responds in coast step-up and kickdown and driving in reverse which is effected by a rearward shift of the idler 49 into mesh with the gears 41 and 43. When the car is driven in this low reverse starting speed, accelerator pedal 148 may be fully released for a coast synchronous step-up by forward shift of sleeve D and the low reverse may be restored by bringing the car to rest or by kickdown operation of the accelerator pedal, the general system operating just as aforesaid.

It will furthermore be apparent that the system will operate to drive the engine A in order to start the same as when the battery 140 is deficient. Under such conditions the driver may shift the sleeve G to either the low or high range and when the car is pushed the pump K will develop sufficient pressure so that when the governor switch M opens the motor H will be energized to effect engagement of the sleeve D and this operation may be somewhat facilitated by momentary operation of the clutch pedal 50 in instances where the blocker E may tend to block the sleeve against engagement.

In the event that the governor L operates to direct an upshift of the transmission C at a time when the driving shaft 21 is rotating at a speed less than that of the sleeve D, motor H will be energized to bias the sleeve D forwardly through the engaging spring 76 as aforesaid, but under such conditions the sleeve D will be blocked by the blocker E in the Fig. 8 coast blocking position of the parts. This condition is experienced when, for example with the transmission set for one of the forward driving speeds of first or third, the car is accelerated by action of gravity down a hill with the engine continuing to idle as accommodated by the overrunning clutch F. As the car increases in speed the governor L will open the governor switch M and effect pressure fluid operation of the motor H and the sleeve D will be brought into the coast block condition of Fig. 8. If now the accelerator pedal 148 is depressed the engine driving shaft 21 will be speeded up to a speed equal to that of the sleeve D and higher than this speed sufficiently to pick up the drive in first or third by engagement of the overrunning clutch F. Under such conditions the sleeve D will not be unblocked even though the speed of shaft 21 passes through the synchronous sleeve relationship with respect to the sleeve D, and the sleeve D will then be established in the drive block position of Fig. 5, as previously set forth in connection with the description of the sleeve and blocker relationships illustrated in Figs. 4 to 8. Clutching engagement of the sleeve D is then effected in response to a release of the accelerator pedal at the time when the engine slows down the driving shaft 21 to a condition of synchronous relationship with respect to rotation of sleeve D, thereby effecting the coast step-up from first or third to either second or fourth depending on whether the manually adjustable sleeve G is positioned in its rearward low range setting or forwardly in its high range setting.

We claim:

1. In a power transmission for a motor vehicle having an engine, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump at a speed proportional to the speed of the vehicle, means for controlling said delivery of pressure fluid to said pressure chamber and venting said chamber comprising, a pilot valve movable between two positions, means limiting said pilot valve to a relatively small stroke in its movement between its said two positions, a main valve movable between two positions, means providing a relatively large stroke of said main valve in its movement between its said two positions, a spring biasing said pilot valve to one of its said positions, solenoid operating means for moving said pilot valve to the other of its said positions, a spring biasing said main valve to one of its positions, means responsive to movement of said pilot valve from one of its said positions to the other for utilizing pressure fluid delivered by the pump to effect pressure fluid movement of said main valve to the other of its said positions in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to the speed of the vehicle, means responsive to return movement of said pilot valve for venting said main valve so as to relieve the same from the movement inducing action of the pressure fluid thereby to effect return movement of said main valve by the action of said spring bias thereon, and means responsive to said return movement of said main valve for venting said pressure chamber.

2. In a power transmission for a motor vehicle having an engine, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump at a speed proportional to the speed of the vehicle, means for controlling said delivery of pressure fluid to said pressure chamber and venting said chamber comprising, a pilot valve movable between two positions, a main valve movable between two positions, a spring biasing said pilot valve to one of its said positions, solenoid operating means for moving said pilot valve to the other of its said positions, a spring biasing said main valve to one of its positions, means responsive to movement of said pilot valve from its said spring biased position to its said other position for utilizing pressure fluid delivered by the pump to effect pressure fluid movement of said main valve to the other of its said positions in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for so controlling energization of said solenoid as a function of speed of the vehicle as to effect de-energization of said solenoid when the vehicle is brought to rest and energization of said solenoid when the vehicle, on accelerating the same from rest by operation of said relatively slow speed driving means, reaches a predetermined speed, means responsive to return movement of said pilot valve for venting said main valve so as to relieve the same from the movement inducing action of the pressure fluid thereby to effect return movement of said main valve by the action of said spring bias thereon, and means responsive to said return movement of said main valve for venting said pressure chamber.

3. In a power transmission for a motor vehicle having an engine equipped with an ignition system, a driving shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump at a speed proportional to the speed of the vehicle, means for controlling said delivery of pressure fluid to said pressure chamber and venting said chamber comprising, a pilot valve movable between two positions, a main valve movable between two positions, a spring biasing said pilot valve to one of its said positions, solenoid operating means for moving said pilot valve to the other of its said positions, a spring biasing said main valve to one of its positions, means responsive to movement of said pilot valve from one of its said positions to the other for utilizing pressure fluid delivered by the pump to effect pressure fluid movement of said main valve to the other of its said positions in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means responsive to return movement of said pilot valve for venting said main valve so as to relieve the same from the movement inducing action of the pressure fluid thereby to effect return movement of said main valve by the action of said spring bias thereon, means responsive to said return movement of said main valve for venting said pressure chamber, means operable to effect momentary interruption of the engine ignition system thereby to facilitate movement of said movable drive control element into its said disengaged relationship as aforesaid, said interruption means including an ignition controlling switch and means for effecting operation thereof in response to movement of said pressure responsive member, and driver operable means for controlling energization of said solenoid.

4. In a power transmission for a motor vehicle having an engine, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump, means for controlling said delivery of pressure fluid to said pressure chamber and venting said chamber comprising, a pilot valve of relatively small inertia movable with a relatively small stroke between two positions, a main valve of relatively large inertia movable with a relatively large stroke between two positions, a spring biasing said pilot valve to one of its said positions, solenoid operating means for moving said pilot valve to the other of its said positions, a spring biasing said main valve to one of its positions, means for supporting and guiding said valves for movement as aforesaid along a common axis, means providing a valve-controlling fluid chamber adapted to receive pressure fluid delivered by said pump and being disposed intermediate said valves, said valve-controlling chamber having a vent communicating therewith and so arranged as to be selectively opened and closed under control of said pilot valve when moved between its aforesaid positions and, when so closed in response to movement of said pilot valve from one of its said positions to the other, to subject said main valve to said pressure fluid so as to effect pressure fluid movement of said main valve to the other of its said positions in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to the speed of the vehicle, means responsive to return movement of said pilot valve for opening the vent for said valve-controlling chamber thereby to relieve said main valve from the movement inducing action of said pressure fluid thereby to effect return movement of said main valve by the action of said spring bias thereon, and means responsive to said return movement of said main valve for venting said pressure chamber.

5. In a power transmission for a motor vehicle having an engine equipped with an accelerator controlled throttle, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump, means for controlling said delivery of pressure fluid to said pressure chamber and venting said chamber comprising, a pilot valve movable between two positions, a main valve movable between two positions, a spring biasing said pilot valve to one of its said positions, solenoid operating means for moving said pilot valve to the other of its said positions, a spring biasing said main valve to one of its positions, means responsive to movement of said pilot valve from one of its said positions to the other for utilizing pressure fluid delivered by the pump to effect pressure fluid movement of said main valve to the other of its said positions in opposition to said spring bias thereon, means responsive to said pressure fluid induced movement of said main valve for effecting communication between the pressure fluid delivered by the pump and said pressure chamber whereby to effect said pressure fluid operation of said pressure responsive member, torque unloading means operable to momentarily relieve the positively interengaged drive control elements of torque imposed thereon by the driving shaft thereby to facilitate said movement of said movable drive control element into said disengaged relationship, control means brought into operation by driver operation of said accelerator in throttle opening direction for controlling energization of said solenoid and for controlling operation of said torque unloading means, means responsive to return movement of said pilot valve for venting said main valve so as to relieve the same from the movement inducing action of the pressure fluid thereby to effect return movement of said main valve by the action of said spring bias thereon, and means responsive to said return movement of said main valve for venting said pressure chamber.

6. In a power transmission for an automotive vehicle having an engine of the type provided with an ignition system and an accelerator controlled throttle, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump, means for controlling said delivery of pressure fluid to said pressure chamber and venting said chamber comprising, a pilot valve movable between two positions, a main valve movable between two positions, a spring biasing said pilot valve to one of its said positions, solenoid operating means for moving said pilot valve to the other of its said positions, a spring biasing said main valve to one of its positions, means responsive to movement of said pilot valve from one of its said positions to the other for utilizing pressure fluid delivered by the pump to effect pressure fluid movement of said main valve to the other of its said positions in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to driver operation of said accelerator in throttle opening direction, means responsive to return movement of said pilot valve for venting said main valve so as to relieve the same from the movement inducing action of the pressure fluid thereby to effect return movement of said main valve by the action of said spring bias thereon, means responsive to said return movement of said main valve for venting said pressure chamber, means operable to effect momentary interruption of the engine ignition system thereby to facilitate movement of said movable drive control element into its said disengaged relationship as aforesaid, said interruption means including an ignition controlling switch and means for effecting operation thereof in response to movement of said pressure responsive member.

7. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a main valve and a pilot valve having predetermined strokes of relatively different lengths, a solenoid for effecting operation of said pilot valve, means responsive to operation of said pilot valve for effecting pressure fluid operation of said main valve, said pilot valve having a small mass relative to that of said main valve, and means limiting the strokes of said valves such that said pilot valve operates over a short stroke relative to that of said main valve.

8. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a pilot valve adapted for reciprocation between limits defining a relatively short stroke movement and a main valve adapted for reciprocation between limits defining a relatively long stroke movement, a solenoid for effecting operation of said pilot valve, and means responsive to operation of said pilot valve for effecting pressure fluid operation of said main valve.

9. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor having a power element for controlling said change speed means, a pump operable to deliver fluid under pressure to said motor, valving means for so controlling said delivery of pressure fluid to said motor as to selectively effect fluid operation of and venting of said motor, said valving means comprising a main valve and a pilot valve, means for actuating said pilot valve including solenoid operating means acting on said pilot valve, means responsive to actuation of said pilot valve for effecting pressure fluid actuation of said main valve means operable to momentarily unload input torque of the driving shaft to said change speed means to facilitate said step-down, means for controlling said torque unloading means including a control device, and means for effecting an operation of said control device as a function of movement of said power element.

10. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively low inertia pilot valve adapted for reciprocation between limits defining a relatively short stroke movement and a relatively high inertia main valve adapted for reciprocation between limits defining a relatively long stroke movement, means for reciprocating said pilot valve as aforesaid including solenoid operating means for actuating said pilot valve in at least one direction of, and between its said limits of, its reciprocatory movement aforesaid, and means responsive to operation of said pilot valve from one of its limits of movement to the other for effecting pressure fluid movement of said main valve in at least one direction of, and between its said limits of, its reciprocatory movement aforesaid.

11. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively low inertia pilot valve adapted for movement between two predetermined positions thereof and a relatively high inertia main valve adapted for movement between two predetermined positions thereof, solenoid means for effecting said movement of said pilot valve, fluid conducting means associated with and so interconnecting said valves, pump, and motor as to effect, when said pilot valve is in one of its said positions, venting of said motor and to effect, upon movement of said pilot valve to the other of its said positions, a pressure fluid operation of said main valve from one of its said positions to the other thereby to effect delivery of pressure fluid from said pump to said motor.

12. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively high inertia main valve adapted for relatively long stroke reciprocatory movement in the direction of its axis and a relatively low inertia pilot valve adapted for relatively short stroke reciprocatory movement coaxially with the movement of said main valve, means providing a valve-controlling fluid chamber adapted to receive pressure fluid delivered by said pump and being disposed intermediate said valves, said valve-controlling chamber having a vent communicating therewith and so arranged as to be selectively opened and closed by said pilot valve, means for effecting operation of said pilot valve comprising solenoid operating means including an armature operably connected to said pilot valve, means biasing said main valve in one direction of its said movement, means controlled by said main valve for venting said motor, and fluid conducting means so interconnecting said pump with said valving means, motor, and valve-controlling chamber as to effect, when said pilot valve is in a position closing said fluid chamber vent, a pressure fluid movement of said main valve in opposition to said biasing means and thereby effect delivery of pressure fluid from said pump to said motor and, when said pilot valve is in a position opening said fluid chamber vent, a return movement of said main valve by its said biasing means accompanied by venting of said motor by said motor venting means.

13. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid and spring operated motor for controlling said change speed means, a pump operable to deliver fluid under pressure to said motor, valving means for so controlling said delivery of pressure fluid to said motor as to selectively effect fluid operation of and venting of said motor, said valving means comprising a main valve and a pilot valve, means for effecting operation of said pilot valve comprising solenoid operating means for moving said pilot valve, means responsive to operation of said pilot valve for effecting pressure fluid operation of said main valve, means responsive to vehicle speed for controlling energization of said solenoid means operable to momentarily relieve input torque in said change speed means to facilitate said step-down, means for controlling said torque relieving means including a control device, and means for effecting an operation of said control device in response to operation of said motor.

14. In a power transmission for a motor vehicle having an engine equipped with an accelerator controlled throttle and an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a main valve and a pilot valve, means for effecting operation of said pilot valve comprising solenoid operating means for moving said pilot valve, means responsive to operation of said pilot valve for effecting pressure fluid operation of said main valve, means responsive to driver operation of said accelerator in throttle opening direction for controlling energization of said solenoid and means responsive to said accelerator operation and operation of said motor for effecting momentary interruption of said system.

15. In a power transmission for a motor vehicle having an engine equipped with an accelerator controlled throttle and an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a main valve and a pilot valve, means for effecting operation of said pilot valve comprising solenoid operating means for moving said pilot valve, means responsive to operation of said pilot valve for effecting pressure fluid operation of said main valve, means including an ignition controlling switch operably responsive to operation of said motor for effecting momentary interruption of the operation of said ignition system thereby to facilitate step-down change in said change speed means, and means responsive to driver operation of said accelerator in throttle opening direction for controlling energization of said solenoid.

16. In a power transmission for a motor vehicle having an engine equipped with an accelerator controlled throttle, a driving shaft adapted to receive drive from the engine, a driven shaft adapted to drive the vehicle, change speed means operably disposed between said shafts for effecting step-up and step-down variation in the speed ratio drive through the transmission, a pressure fluid and spring operated motor for controlling said change speed means, a pump operable to deliver fluid under pressure to said motor, valving means for so controlling said delivery of pressure fluid to said motor as to selectively effect fluid operation of and venting of said motor, spring means for operating said motor when vented, said valving means comprising a main valve and a pilot valve, means for effecting operation of said pilot valve comprising solenoid operating means for moving said pilot valve, means responsive to operation of said pilot valve for effecting pressure fluid operation of said main valve, means responsive to the vehicle attaining a predetermined speed for so controlling energization of said solenoid as to effect pressure fluid operation of said motor, and means responsive to driver operation of said accelerator, when the vehicle speed is above that aforesaid, for so controlling energization of said solenoid as to effect venting of said motor, and means including an ignition controlling switch operably responsive to operation of said motor by said spring means for effecting momentary interruption of the operation of said ignition system thereby to facilitate said step-down.

17. In a power transmission for a motor vehicle having an engine provided with an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said motor comprising a casing structure formed with a cylinder providing a pressure fluid chamber, an abutment member carried by said casing structure and having a guideway coaxial with said cylinder, a piston having a skirted portion slidably engaging the walls of said cylinder and adapted for pressure fluid induced movement, a rod in thrust receiving relationship with said piston and having an end portion slidably supported in said guideway, said change speed means comprising an element shiftable for controlling said variation in the transmission speed ratio drive, a relatively small force compression spring having one end thereof extending within the skirted portion of said piston for seating on said piston, the other end of said spring being disposed for transmitting thrust to said shiftable element whereby to move said element in one direction in response to pressure fluid operation of said piston, a relatively large force compression spring disposed coaxially with respect to said small force spring and so arranged as to bias said shiftable element and said piston for return movement when said motor is vented, means providing an overtravel of said shiftable element by said piston during said pressure induced movement of said piston defining a predetermined amount of return movement of said piston relative to said shiftable element when said motor is vented, and means including an ignition cotnrol switch operated by said predetermined amount of return movement of said piston for effecting interruption of said ignition system to facilitate said step-down.

18. In a power transmission for a motor vehicle having an engine provided with an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said motor comprising a casing structure formed with a cylinder providing a pressure fluid chamber, means carried by said casing structure provided with a guideway coaxial with said cylinder, a piston having a skirted portion slidably engaging the walls of said cylinder and adapted for pressure fluid induced movement, a rod in thrust receiving relationship with said piston and having an end portion slidably supported in said guideway, said change speed means comprising an element shiftable for controlling said variation in the transmission speed ratio drive, a relatively small force compression spring having one end thereof extending within the skirted portion of said piston for seating on said piston, the other end of said spring being disposed for transmitting thrust to said shiftable element whereby to move said element in one direction in response to pressure fluid operation of said piston, a relatively large force compression spring disposed coaxially with respect to said small force spring and so arranged as to bias said shiftable element and said piston for return movement when said motor is vented, said casing structure having an end wall against which said piston abuts to limit its said return movement, said end wall having a cylindrical bore of a diameter less than that of said cylinder, said piston having a cylindrical extension projecting therefrom in a direction away from said skirted portion and adapted to slidably engage the walls of said cylindrical bore, means providing an overtravel of said shiftable element by said piston during said pressure induced movement of said piston defining a predetermined amount of return movement of said piston relative to said shiftable element when said motor is vented, and means including an ignition control switch operated by said cylindrical piston extension during said predetermined amount of return movement of said piston for effecting interruption of said ignition system to facilitate said step-down.

19. In a power transmission for a motor vehicle, a driving shaft adapted to receive drive from the engine, a driven shaft adapted to drive the vehicle, change speed means for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively long stroke high inertia main valve and a relatively short stroke low inertia pilot valve, said change speed means comprising relatively slow speed drive means for accelerating the vehicle from rest and relatively fast speed driving means operable, in response to coast down of the driving shaft, to effect said step-up, said fast driving means including positively interengageable drive control elements, one of which is adapted for movement by the power operating element of said motor, and means blocking engagement of said movable element with the other of said elements until said shafts rotate at substantially the same speed during coast down of said driving shaft, solenoid operating means for effecting operation of said pilot valve, means responsive to operation of said pilot valve for effecting pressure fluid operation of said main valve, and means for so controlling energization of said solenoid in response to accelerating the vehicle from rest in said slow drive to a predetermined speed as to effect said pressure fluid operation of said main valve and motor thereby bringing said blocking means into operation to delay said engagement of said movable element until coast down of said driving shaft as aforesaid.

20. In a power transmission according to claim 19, means for effecting said step-down including means operable under control of the vehicle driver for effecting an operation of said pilot valve thereby causing said main valve to vent said motor, and torque unloading means for said change speed means operable under control of said motor in response to operation of said driver control means.

TENO IAVELLI.
VICTOR E. MATULAITIS.

REFERENCES CITED

The following references are of record in the file of this patent:

UNITED STATES PATENTS

| Number | Name | Date |
|---|---|---|
| 2,229,345 | Schotz | Jan. 21, 1941 |
| 2,348,763 | Syrovy et al. | May 16, 1944 |

Certificate of Correction

Patent No. 2,490,592 December 6, 1949

TENO IAVELLI ET AL.

It is hereby certified that errors appear in the printed specification of the above numbered patent requiring correction as follows:

Column 6, line 24, for the syllable and hyphen "clutch-" read *clutching*; column 8, line 62, for the word "rations" read *ratios*; column 9, line 6, for "Sleeve DD" read *Sleeve D*; column 12, line 46, for "When" read *With*; column 14, line 12, for "leave" read *leaves*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*